US011585399B2

(12) United States Patent
Macchietto (10) Patent No.: US 11,585,399 B2
(45) Date of Patent: Feb. 21, 2023

(54) METHOD AND APPARATUS OF PROVIDING ENERGY ABSORPTION FOR VIBRATION DAMPENING IN ONE OR MORE PLANES

(71) Applicant: Valmont Industries, Inc., Omaha, NE (US)

(72) Inventor: Carl J. Macchietto, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 44 days.

(21) Appl. No.: 17/243,017

(22) Filed: Apr. 28, 2021

(65) Prior Publication Data

US 2021/0348667 A1 Nov. 11, 2021

Related U.S. Application Data

(60) Provisional application No. 63/021,770, filed on May 8, 2020.

(51) Int. Cl.
*F16F 7/10* (2006.01)

(52) U.S. Cl.
CPC .............. *F16F 7/10* (2013.01); *F16F 7/1034* (2013.01); *F16F 2222/08* (2013.01); *F16F 2234/08* (2013.01)

(58) Field of Classification Search
CPC .. F16F 7/015; F16F 7/10; F16F 7/1034; F16F 2222/08; F16F 2234/08
See application file for complete search history.

(56) References Cited

U.S. PATENT DOCUMENTS

| 4,713,917 | A | 12/1987 | Buckle et al. |
| 6,237,302 | B1 | 5/2001 | Robert |
| 6,321,492 | B1 | 11/2001 | Robinson |
| 6,802,405 | B2 * | 10/2004 | Barcock ............... F16F 7/015 248/638 |
| 8,991,574 | B2 | 3/2015 | Provost et al. |
| 9,121,466 | B2 | 9/2015 | Tsugihashi et al. |
| 9,500,257 | B2 | 11/2016 | Kanaya et al. |
| 9,593,828 | B2 | 3/2017 | Macchietto et al. |

(Continued)

FOREIGN PATENT DOCUMENTS

| CN | 101023227 A | 8/2007 |
| CN | 103557266 A | 2/2014 |

(Continued)

OTHER PUBLICATIONS

International Application PCT/US2018/060881, International Search Report and Written Opinion dated Jan. 23, 2019, 12 pages.

*Primary Examiner* — Thomas W Irvin
(74) *Attorney, Agent, or Firm* — Milligan PC LLO (57) ABSTRACT

The present invention provides a method and apparatus for energy absorption and vibrational dampening when attached to a vertical or horizontal structure. According to a first preferred embodiment, the present invention includes a closed housing which may preferably include an internal, curved surface. According to a further preferred embodiment, the present invention may include at least one dampening weight or sphere which may preferably be disposed within the closed housing. According to a further preferred embodiment, the dampening sphere may include internal baffling such as particles having resistance to the flow of the particles within the closed housing.

20 Claims, 10 Drawing Sheets

(56) References Cited

U.S. PATENT DOCUMENTS

| | | | | |
|---|---|---|---|---|
| 9,855,610 B2* | 1/2018 | Frank | ................ | B23Q 11/0035 |
| 10,443,684 B2* | 10/2019 | Chern | ................... | F16F 15/264 |
| 10,473,185 B2* | 11/2019 | Zouani | .................... | F16H 55/17 |
| 10,704,639 B2* | 7/2020 | Hart | .................... | H05K 1/0271 |
| 10,900,532 B2* | 1/2021 | Macchietto | ............. | F16F 7/015 |
| 2002/0030315 A1 | 3/2002 | Kato et al. | | |
| 2007/0012530 A1 | 1/2007 | Garcia | | |
| 2012/0024646 A1 | 2/2012 | Tsugihashi et al. | | |
| 2015/0323033 A1 | 11/2015 | Macchietto et al. | | |
| 2019/0154099 A1* | 5/2019 | Macchietto | ........... | F16F 7/1022 |

FOREIGN PATENT DOCUMENTS

| | | |
|---|---|---|
| GB | 1280301 A | 7/1972 |
| GB | 1293391 A | 10/1972 |
| GB | 1303990 A | 1/1973 |
| JP | 2000046103 A | 2/2000 |
| JP | 2000046106 A | 2/2000 |
| JP | 2001219848 A | 8/2001 |
| WO | 9001645 A1 | 2/1990 |

* cited by examiner

METHOD AND APPARATUS OF PROVIDING ENERGY ABSORPTION FOR VIBRATION DAMPENING IN ONE OR MORE PLANES

RELATED APPLICATIONS

The present application claims priority to U.S. Provisional Application No. 63/021,770 filed May 8, 2020.

FIELD OF INVENTION

The present invention is related in general to vibration dampening and, in particular, to a method and apparatus of providing energy absorption for vibration dampening in at least one or more planes.

BACKGROUND OF THE INVENTION

Road and wind vibrations are a significant impediment to a variety of vertical structures such as light poles. These vibrations are particularly problematic when the structure is lightly damped, and road or wind excitations is near the natural frequencies of the structure. When this problem occurs, the energy of large excitations can cause fatigue failures of the structures.

A number of different solutions have been applied to reduce vibrations of poles. Prior art, in particular U.S. Pat. No. 7,871,186 B2, has used weights, solid ball(s), to impact the walls of a damper chamber to provide energy dissipation. The energy dissipation in this prior art has been limited to impact. More recently, U.S. Pat. No. 9,593,828 discloses a sealed bowl which dissipates energy as a mass damper approach, with a mass element, stiffness tuned at a particular frequency and damping of the moving mass achieved in some specific manner.

Other similar solutions, not applied to pole structures with translational vibration, however, include filling a chamber with granular material to dissipate energy by either the granular material impacting the wall, friction against the other granular material as it moves about, or a paddle/element moving through the granular material. US Publication No. 20120024646A1 discloses a seismic control structure for a building which acts as a dampening structure in this manner. Still further, WO1990001645A1 discloses a vibration dampening material which uses viscoelastic spheres to fill restricted areas such as structural boxes, walls and around pipes in this manner.

While each of the prior art solutions may be effective in selected circumstances, there remains an important need to provide further effective dampening for light poles and similar structures which are repeatedly subject to vibrations in a simple, robust and practical manner. Further, there is a need for a method and apparatus for providing effective dampening of various modes of vibrations for a range of different types of poles.

SUMMARY OF THE DISCLOSURE

To minimize the limitations found in the prior art, and to minimize other limitations that will be apparent upon the reading of the specifications, the present invention provides a method and apparatus for energy absorption and vibrational dampening when attached to a vertical or horizontal structure.

According to a first preferred embodiment, the present invention includes a closed housing which may preferably include a flat or curved floor surface. According to a further preferred embodiment, the present invention may include at least one dampening weight or sphere which may preferably be disposed within the closed housing.

According to a further preferred embodiment, the dampening sphere may include internal baffling such as particles having resistance to the flow of the particles within the closed housing.

According to a further preferred embodiment, the closed housing may preferably include an internal, curved surface which provides an effective stiffness or restoring force that enacts the frequency tuning of the tuned mass damper.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and to improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Further, various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1A:
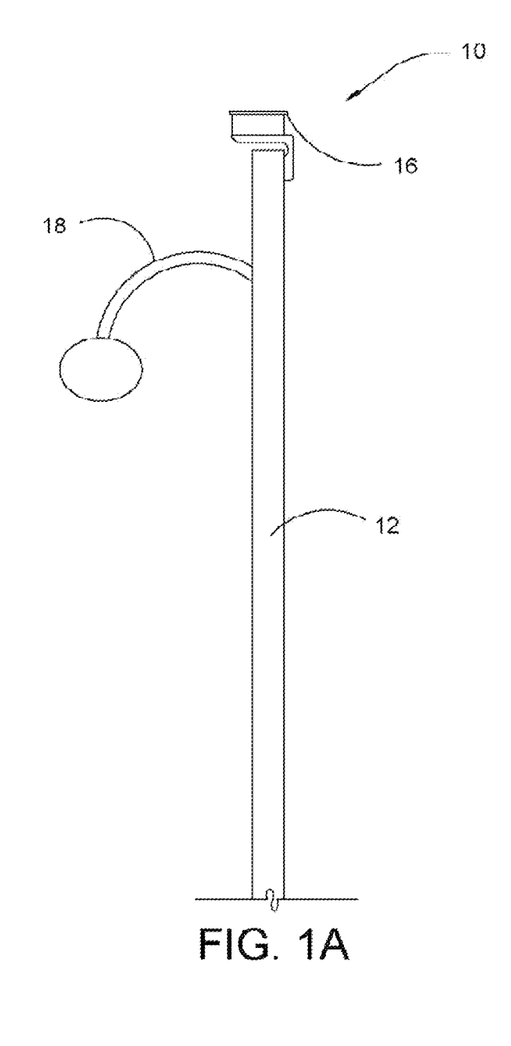
FIG. 1A is a side view of an exemplary light pole fitted with a dampening device in accordance with a first aspect of the present invention.
Figure 1B:
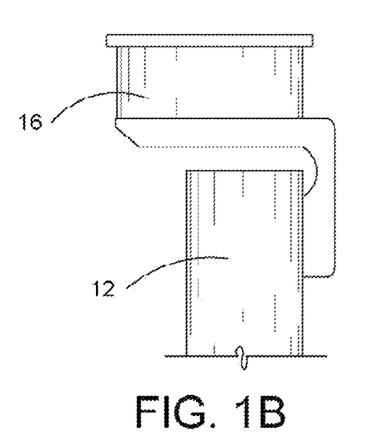
FIG. 1B is an enlarged view of the dampening device shown in FIG. 1A.

FIG. 1A illustrates a perspective view 10 of an exemplary light pole 12 fitted with a dampening device 16 in accordance with a first aspect of the present invention. FIG. 1B is an enlarged view of the dampening device 16 shown in FIG. 1A. As shown, the exemplary dampening device 16 may preferably be position at or near the top end of a light pole 12. The mounting of the dampening device 16 may be with any form of connector or clamp of conventional construction. As should be understood, the light pole 12 is purely exemplary and the present invention may be attached to any structure to achieve the advantages of the present invention. For example, the present invention may be used to address out of plane movement for both horizontal and/or vertical structures.

As further shown in FIG. 1A, the light pole 12 may preferably be further secured to a base 14 and may preferably support a light 18. Alternatively, the structure represented by the light pole 12 may further include a cantilevered arm or the like and may support various objects such as signs, traffic lights, over-head wires and the like. According to a further alternative preferred embodiment, the exemplary dampening device 16 of the present invention may alternatively be positioned in the mid and/or lower sections of the light pole 12 as discussed further below.

Figure 2:
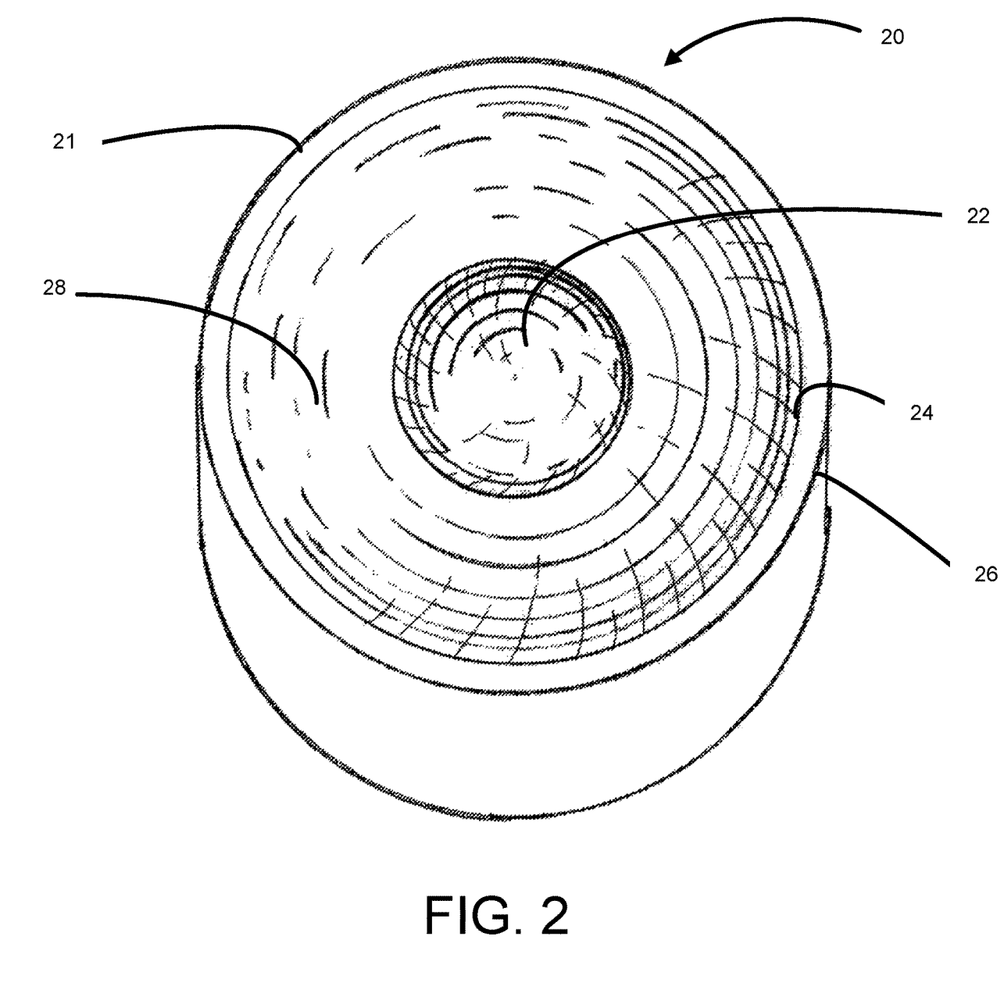
FIG. 2 is a top perspective view of the dampening device shown in FIG. 1A with an exemplary dampening sphere in accordance with a first aspect of the present invention.

With reference now to FIG. 2, a top perspective view 20 of the interior of the dampening device 16 shown in FIG. 1A is provided. As shown, the exemplary dampening device 16 may preferably include an enclosed lower portion 21 which includes a center floor 28 surrounded by an interior wall 24 and enclosed by an outer wall 26. According to a preferred embodiment, the center floor 28 may preferably be concave with a constant radius. According to a further preferred embodiment, the center floor 28 may preferably be of a varying radius of curvature to achieve effective realizations of nonlinear energy sinks. Alternatively, the center floor 28 may be a flat surface (zero curve) bounded by the outer walls 26. According to a further preferred embodiment, the interior wall 24 may preferably be ringed with a deformable, impact absorbing material such as plastic, stuffed fabric or other padding type materials.

As further shown in FIG. 2, the lower portion 21 of the dampening device 16 may preferably support and enclose one or more dampening spheres 22. According to a preferred embodiment, the dampening spheres 22 of the present invention may preferably be hollow spheres which are selectively filled with energy absorbing materials and other internal baffling as discussed with respect to FIG. 3 below.

Figure 3:
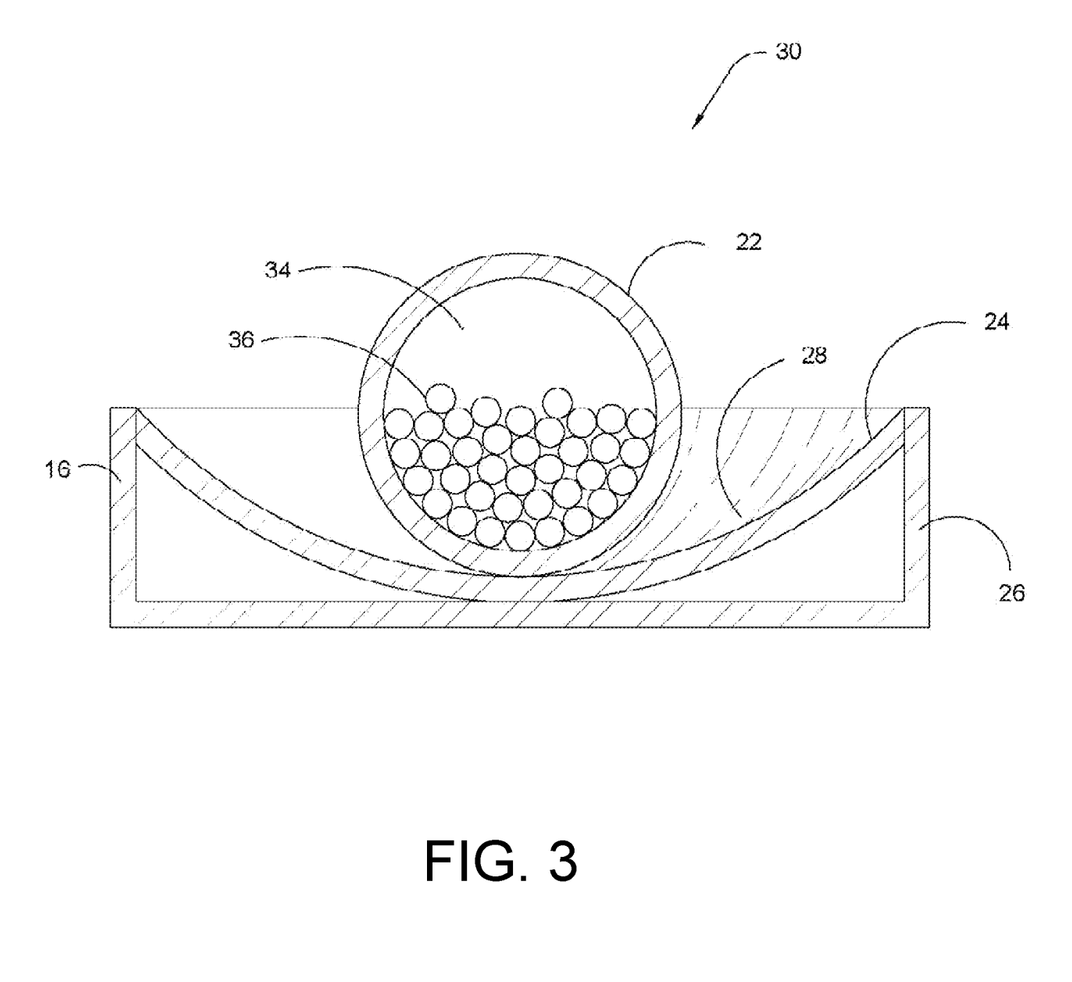
FIG. 3 is a cross-sectional view of the dampening device and dampening sphere shown in FIG. 2.

With reference now to FIG. 3, a cross-sectional view 30 of an exemplary dampening device 16 and dampening sphere 22 as shown in FIGS. 1A, 1B and 2 is provided. As shown in FIG. 3, the dampening device 16 includes an inner surface 24 which preferably includes and forms a center floor 28. Further, the dampening device 16 preferably further includes an outer shell 26 which preferably encloses the inner surface 24 and at least one dampening sphere 22. According to preferred embodiments, the inner surface 24 and the center floor 28 may substantially overlap and act as a single, curved surface as shown in FIG. 3. Alternatively, the inner surface 24 may include a lip, edge, border or other boundary which defines a separate center floor 28 which is apart from other sections or walls of the inner surface 24.

According to a further preferred embodiment, the dampening sphere 22 may preferably include a hollow center region 34 which may be filled with energy absorbing particles/baffling 36 and/or liquids/gels and/or internal baffling structures. According to a further preferred embodiment, the energy absorbing particles 36 may preferably be sand, aluminum, stainless-steel shot or the like. Alternatively, the energy absorbing particles 36 may be made of any material without limitation. For example, the particles 36 may be formed of materials such as: plastic, metal, rubber, stone, silicone, mercury and/or other materials which provide mass, and which can transfer kinetic energy. Alternatively, a gel or liquid may be used in combination with or in place of the energy absorbing particles 36.

According to an alternative preferred embodiment, the walls of the dampening device 16 may be utilized to abruptly stop the dampening sphere(s) 22 resulting in an impact load and dissipation of energy as the moving particles impact the inside wall of the moving sphere 22. During such impacts, the kinetic energy of the moving particles is dissipated as the particles impact and come to rest. Preferably, the sphere(s) 22 acts as a mechanism to convert the energy of wind excitation and/or pole vibration into kinetic energy of the energy absorbing particles, while the sudden impact with the dampening device wall dissipates that energy. According to a further preferred embodiment, the interior wall(s) of the dampening device 16 can be coated with a material to absorb further energy and/or quite the sound of the impact.

According to alternative preferred embodiments, the energy absorbing particles 36 may preferably be any size and may be formed from a variety of materials including stainless steel, sand, lead shot, aluminum and the like. Preferably, the materials may be selected based on their specific densities and their particular ability to capture and translate vibrational energy into kinetic energy within the dampening sphere 22. According to a preferred embodiment, the particles 36 may preferably be of a sufficient density to allow for a greater absorption of higher energy vibrations.

According to a further preferred embodiment, the particles 36 of the present invention may preferably be sealed and protected against corrosion. Accordingly, the particles 36 may preferably be heated to a sufficient temperature prior to sealing to remove any humidity or moisture. According to a further preferred embodiment, 20-90% of the interior volume of the dampening sphere 22 may preferably be filled with particles 36. According to a further preferred embodiment, 70-90% of the interior volume of the dampening sphere 22 may preferably be filled with particles 36. According to a further preferred embodiment, 50-60% of the interior volume of the dampening sphere 22 may preferably be filled with particles 36. While these ranges are suggested, they are intended to be exemplary and many other ranges may be used to address different vibrational environments. According to further alternative embodiments, the interior volume of the dampening sphere 22 may further be filled with a variety of liquids in addition to the particles 36. According to preferred embodiments, a liquid may be added in sufficient amounts to make a slurry mixture within the dampening sphere. According to further preferred embodiments, the liquid may include glycol antifreeze or the like to prevent freezing of the enclosed liquid(s).

Figure 8:
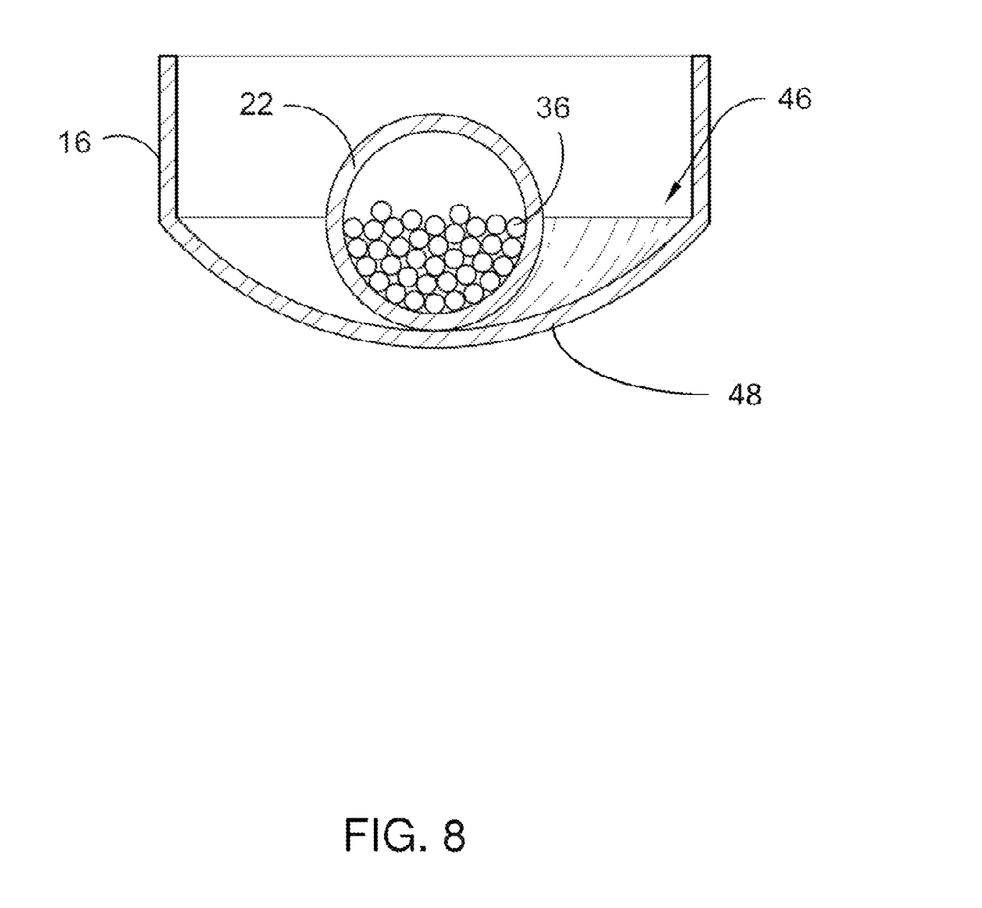
FIG. 8 is a cross-section view of an alternative embodiment of the dampening device.

According to an alternative preferred embodiment, the dampening sphere of the present invention may preferably include a first sized dampening particle for use and attachment to the upper portions of the light pole 12 and a second sized particle for use and attachment to the mid or lower portion of the light pole 12. According to a further preferred embodiment, the first sized particles for use and attachment to the upper portions of the light pole 12 may have a lower density than the second sized particles. According to a further preferred embodiment, the first sized particles may preferably be selected and formed to most effectively absorb vibrational energy from wind vibration and/or the upper swaying of the pole 12. According to a further preferred embodiment, the second sized particles may preferably be selected and formed to most effectively absorb vibrational energy from road vehicles and the like. The profile of center floor 28, the material and physical properties of particles 36, the size and interior volume of sphere 22 may all be adjusted to provide specific levels of mass, stiffness and damping for effective vibration mitigation of various applications. As shown in FIG. 8, the dampening device 16 of the present invention may alternatively include a sloped or bowled lower surface 48 which acts as both the inner surface floor and the outer shell of the dampening device.

With reference now to FIGS. 9-12, a variety of alternative shapes and structures may be used as internal baffling within the volume of a given sphere 22. Additionally, as discussed further below, each of the alternative shapes and structures discussed herein may be used individually or in combination with any of a variety of other shapes, structures, internal dampening materials and/or particles including elements within any of the embodiments discussed herein.

Figure 9:
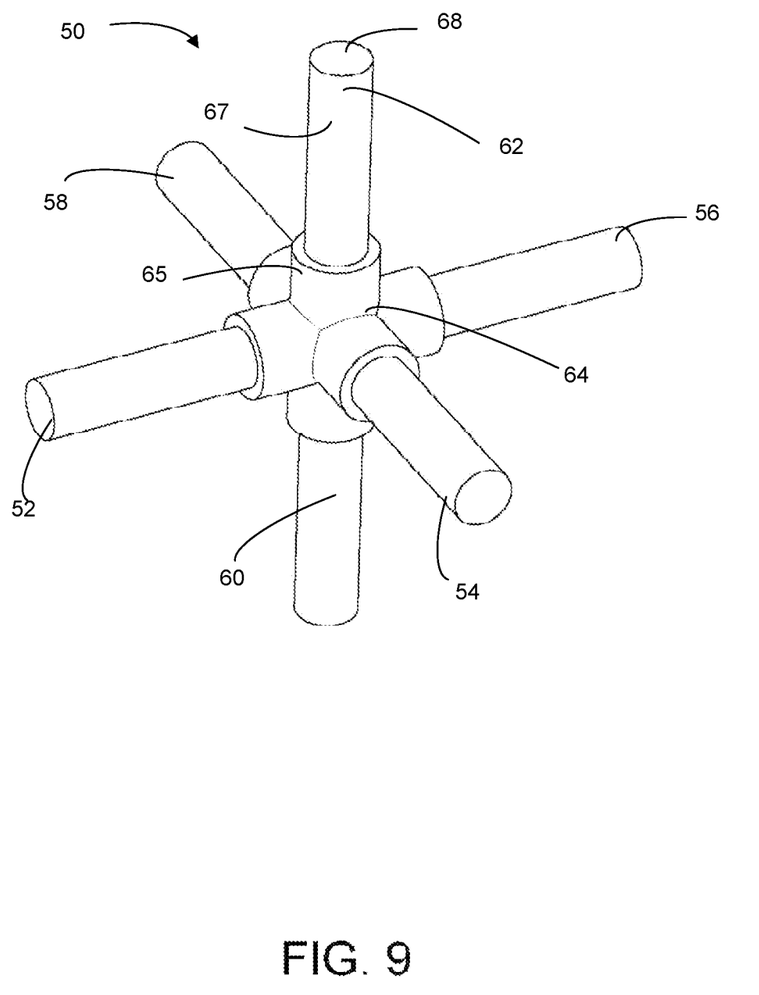
FIG. 9 is an illustration of a first exemplary internal baffling for use within the dampening device.

As shown in FIG. 9, a first exemplary internal baffling 50 may be formed from six cylinders 52-62 which are connected at a central connecting point 64. As shown, each of the six cylinders 52-62 may preferably include a cylindrical base 65, a cylindrical midsection 67 and a circular top 68. According to a preferred embodiment, the internal baffling 50 may be formed with each of the four cylinders 52, 54, 56 and 58 being orthogonal to at least two other cylinders within a first plane to generally form a square planar structure/shape/form. As further shown, the internal baffling 50 may preferably further include two additional cylinders 60, 62 which are linearly aligned in a second plane and orthogonally aligned to the first plane to generally form an octahedral structure/shape/form.

Figure 10:
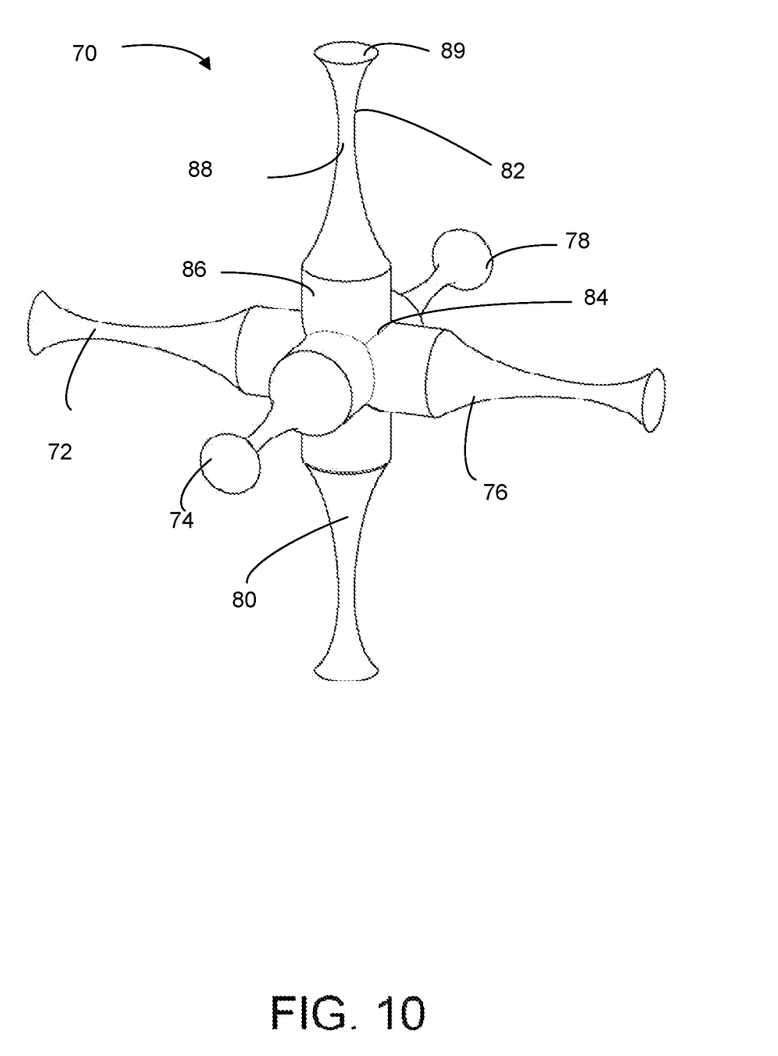
FIG. 10 is an illustration of a second exemplary internal baffling for use within the dampening device.

With reference to FIG. 10, a second exemplary internal baffling 70 may be formed from six fluted-cylinders 72-82 which are connected at a central connecting point 84. As shown, each of the six fluted-cylinders 72-82 may preferably include a cylindrical base 86, a cylindrically fluted midsection 88 and a circular top 89. According to a preferred embodiment, the internal baffling 70 may be formed with four of the fluted-cylinders 72-78 being orthogonal to at least two other cylinders within a first plane to generally form a square planar structure/shape/form. As further shown, the internal baffling 70 may preferably further include two additional cylinders 80, 82 which are linearly aligned in a second plane and orthogonally aligned to the first plane to generally form an octahedral structure/shape/form.

Figure 11:
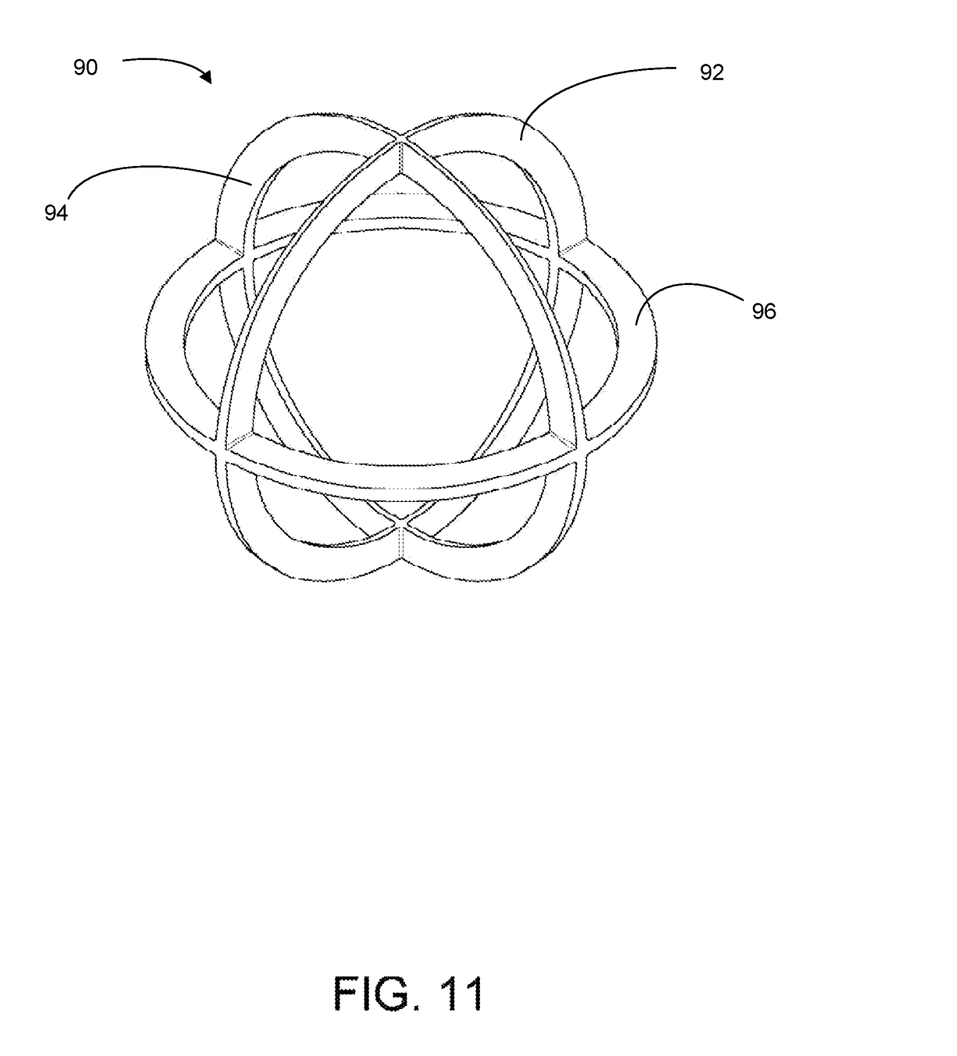
FIG. 11 is an illustration of a third exemplary internal baffling for use within the dampening device.

As shown in FIG. 11, a third exemplary internal baffling 90 for use within the volume of a given sphere 22 may be formed from three intersecting annuli 92, 94, 96. Preferably, each annuli may be orthogonal to the each other in at least one plane. In the exemplary internal baffling 90 shown, the first annulus 92 orthogonally intersects the second annulus 94 at exactly two points. Likewise, the second annulus 94 orthogonally intersects with the third annulus 96 at exactly two points. Finally, the third annulus 96 orthogonally intersects with the first annulus 92 at exactly two points.

Figure 12:
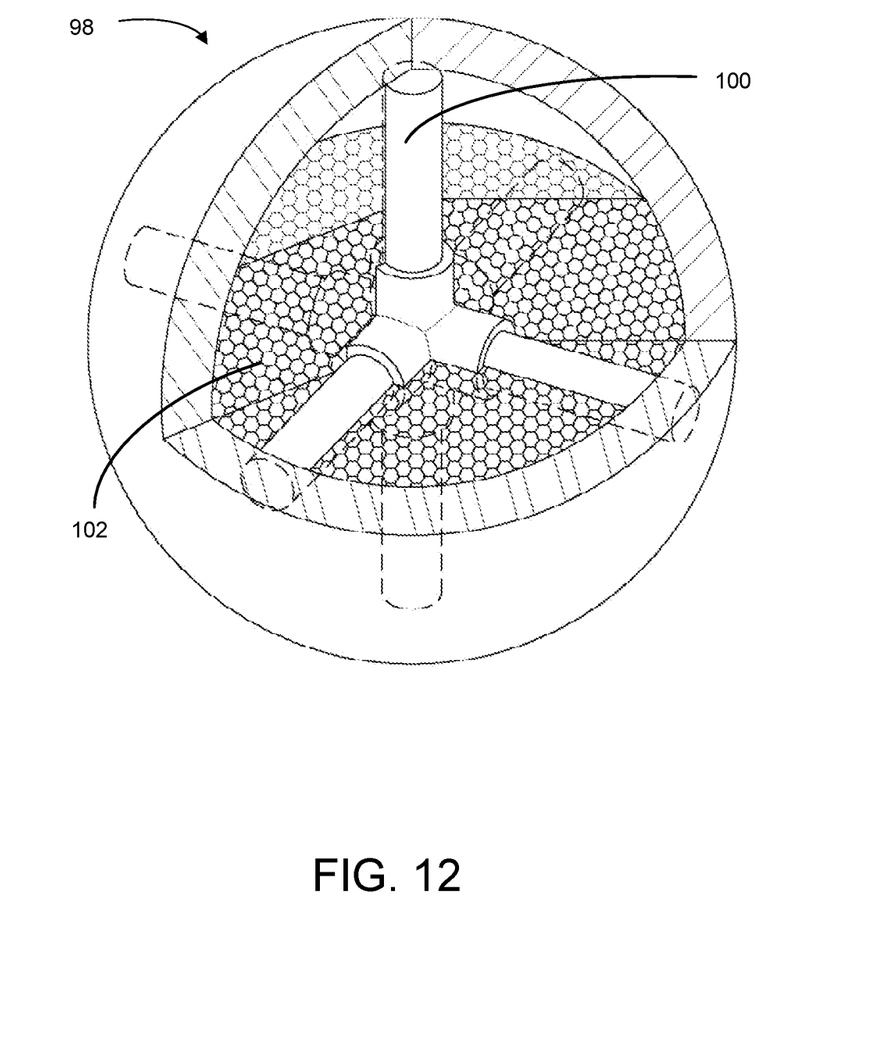
FIG. 12 is an illustration of a dampening device which includes a combination of internal baffling materials.

With reference now to FIG. 12, an exemplary dampening sphere 98 is shown including an exemplary combination of internal baffling materials. Specifically, FIG. 12 illustrates the combination of a first exemplary internal baffling 100 (such as discussed above with reference to FIG. 9) and exemplary particles/granular material(s) 102 (i.e. sand, shot or other particles as discussed above) which may be dry or suspended in a liquid/gel medium. According to a further preferred embodiment, one or more portions of a given dampening sphere may be made solid so that selected internal baffling 100/102 may fill only a portion of the interior volume of a given dampening sphere 98.

Additionally, any of a variety of other materials, structures and shapes (including their equivalences) as discussed herein may be used in combination with every other material, structure and shape discussed herein without limitation. In particular, the embodiments discussed above with respect to FIGS. 9-12 may include any of a variety of other baffling shapes and materials without limitation. For example, the embodiments shown in FIGS. 9 and 10 are illustrated and described as shapes including six cylinders. Alternatively, these baffles may be formed in any of a variety of other shapes and may include different configurations such as shapes with 3-100 or more cylinders or other intersecting shapes without limitation. Similarly, the embodiments discussed above with respect to FIG. 11 may include any number of additional annuli without limitation (i.e. 3-100). Still further, the present invention may include a variety of different ways to include and/or construct baffling in the inside of a given dampening sphere. For example, the internal baffling may be formed as individual pegs/pins extending from the internal wall of a given dampening sphere.

Figure 4:
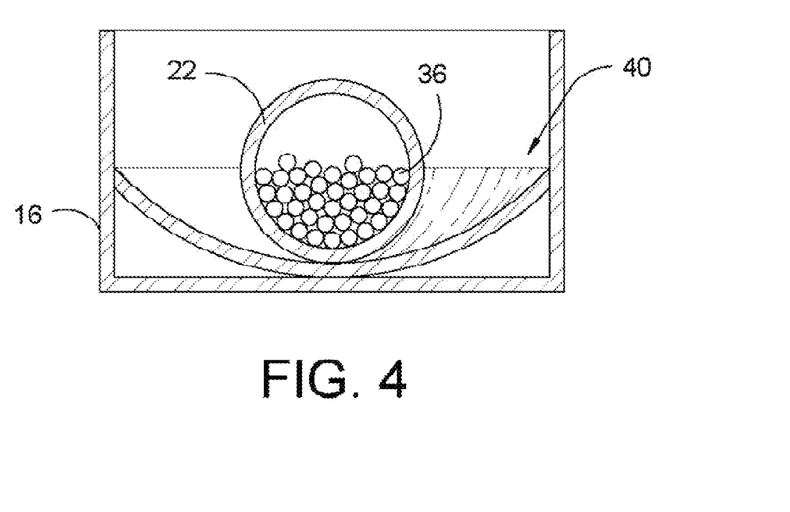
FIG. 4 is a cross-sectional view of a dampening sphere in a starting zero-energy state

With reference now to FIGS. 4-7, an example of the operation of an exemplary dampening sphere 22 of the present invention shall now be discussed. In FIG. 4, a cross-sectional view of a dampening sphere 22 is shown where the dampening sphere 22 is in a starting or zero-energy state 40 where the particles 36 are at rest and the dampening sphere 22 is not subject to vibrational forces.

Figure 5:
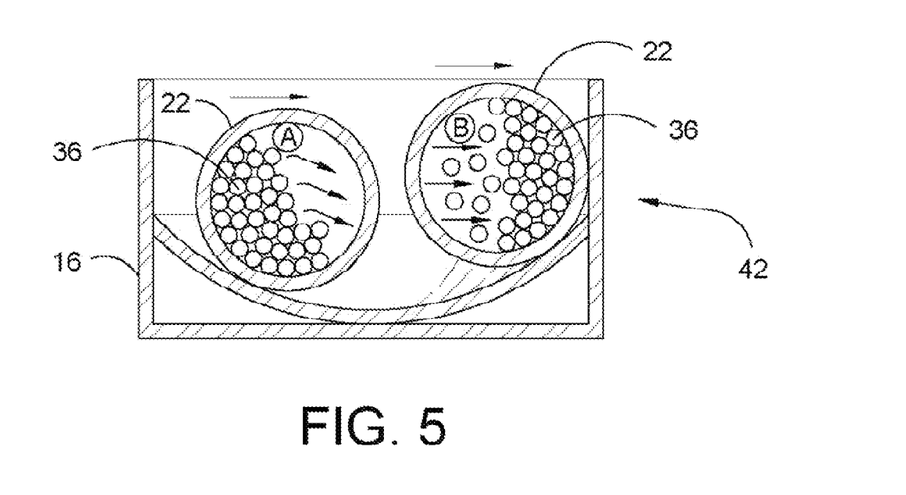
FIG. 5 is a cross-sectional view of the dampening sphere shown in FIG. 4 in a first energy release state.

FIG. 5 shows a cross-sectional view of the dampening sphere 22 in a first energy release state 42. In this state, in response to vibrational forces, the dampening sphere 22 has been made to roll from a first position A to a second position B within the dampening device 16. As shown, the particles 36 at position A have been raised to store potential energy which is then released in a tumbling or leveling action as the sphere 22 moves to position B. As further shown, in position B, the sphere 22 may impact the wall of the dampening device 16 and further transfer kinetic energy from the impact into sphere 22.

Figure 6:
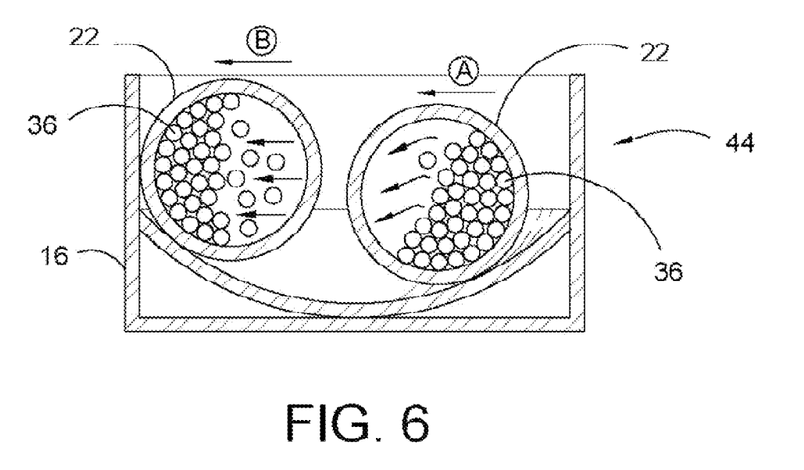
FIG. 6 is a cross-sectional view of the dampening sphere shown in FIG. 5 in a second energy release state.

FIG. 6 shows a cross-sectional view of the dampening sphere 22 in a second energy release state 44. In this state 44, in response to the movement of sphere 22 to a higher point on the center floor 28 (and/or a wall impact), the particles 36 at position A in FIG. 6 will preferably tumble and seek to level thereby releasing kinetic energy as the sphere moves to position B. Subsequently, at position B the particles 36 will preferably again store potential energy which is once again released in a tumbling or leveling action as the system moves back to energy release state 42 as discussed with respect to FIG. 5 above. According to preferred embodiments, with each change between the first and second energy release states, the kinetic energy of system is preferably continually reduced/dissipated due to the friction of the particles 36 and the retarding effects of gravitation.

Figure 7:
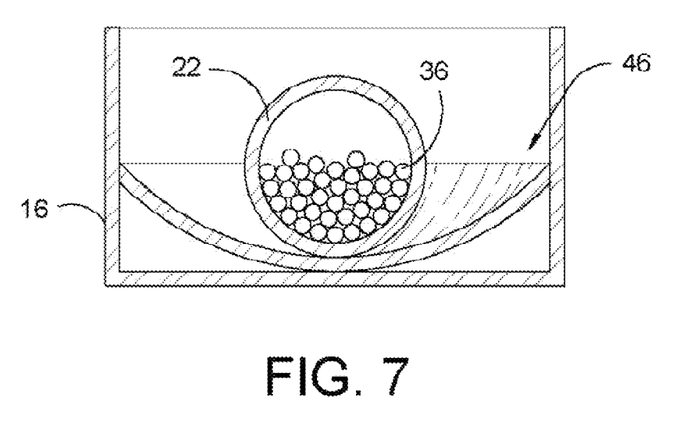
FIG. 7 is a cross-sectional view of a dampening sphere in a final zero-energy state.

In operation, the translation of the dampening sphere 22 from the first energy state 42 to the second energy state 44 may occur any number of times as energy is slowly dissipated from the dampening device 16. As shown in FIG. 7, once all the energy has been dissipated, the dampening sphere 22 preferably returns to a final zero-energy state 46. The addition of internal baffling can be included within the embodiments shown in FIGS. 3,4,5,6, and 8 to alter the overall dampening performance by impeding the tumbling energy absorbing material.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An apparatus for damping vibration in at least one plane, the apparatus comprising:
    an enclosed housing; wherein the enclosed housing is comprised of a bottom wall and a side wall;
    a flooring surface, wherein the flooring surface is enclosed within the enclosed housing; wherein the flooring surface comprises a bowl-shaped surface; and
    a dampening weight, wherein the dampening weight is located within the enclosed housing; further wherein the dampening weight is comprised of a first mass which is configured to move on the flooring surface; wherein the dampening weight comprises: an inner cavity; and an internal baffling within the inner cavity;
    wherein the internal baffling comprises six cylinders connected at a central connecting point; wherein at least one cylinder comprises a cylindrical base and a cylindrical midsection.

2. The apparatus of claim 1, wherein at least four of the cylinders are orthogonal to at least two other cylinders in a first plane to form a square planar structure; further wherein at least two cylinders are linearly aligned in a second plane and orthogonally aligned to the first plane to form an octahedral structure.

3. An apparatus for damping vibration in at least one plane, the apparatus comprising:
    an enclosed housing; wherein the enclosed housing is comprised of a bottom wall and a side wall;
    a flooring surface, wherein the flooring surface is enclosed within the enclosed housing; wherein the flooring surface comprises a bowl-shaped surface; and
    a dampening weight, wherein the dampening weight is located within the enclosed housing; further wherein the dampening weight is comprised of a first mass which is configured to move on the flooring surface; wherein the dampening weight comprises: an inner cavity; and an internal baffling within the inner cavity;
    wherein the internal baffling comprises six fluted cylinders connected at a central connecting point.

4. The apparatus of claim 3, wherein at least one fluted cylinder comprises a cylindrical base and a cylindrically fluted midsection.

5. The apparatus of claim 4, wherein at least four of the fluted cylinders are orthogonal to at least two other fluted cylinders in a first plane to form a square planar structure.

6. The apparatus of claim 5, wherein at least two fluted cylinders are linearly aligned in a second plane and orthogonally aligned to the first plane to form an octahedral structure.

7. An apparatus for damping vibration in at least one plane, the apparatus comprising:
    an enclosed housing; wherein the enclosed housing is comprised of a bottom wall and a side wall;
    a flooring surface, wherein the flooring surface is enclosed within the enclosed housing; wherein the flooring surface comprises a bowl-shaped surface; and
    a dampening weight, wherein the dampening weight is located within the enclosed housing; further wherein the dampening weight is comprised of a first mass which is configured to move on the flooring surface; wherein the dampening weight comprises: an inner cavity; and an internal baffling within the inner cavity;
    wherein the internal baffling comprises three intersecting annuli; wherein the annuli comprise a first annulus, a second annulus and a third annulus.

8. The apparatus of claim 7, wherein each of the annuli are orthogonal to at least one other annuli in at least one plane.

9. The apparatus of claim 8, wherein a first annulus orthogonally intersects the second annulus at exactly two points.

10. The apparatus of claim 9, wherein the second annulus orthogonally intersects with the third annulus at exactly two points.

11. The apparatus of claim 10, wherein the third annulus orthogonally intersects with the first annulus at exactly two points.

12. An apparatus for damping vibration in at least one plane, the apparatus comprising:
    an enclosed housing; wherein the enclosed housing is comprised of a bottom wall and a side wall;
    a flooring surface, wherein the flooring surface is enclosed within the enclosed housing; wherein the flooring surface comprises a bowl-shaped surface; and
    a dampening weight, wherein the dampening weight is located within the enclosed housing; further wherein the dampening weight is comprised of a first mass which is configured to move on the flooring surface;
    wherein the dampening weight comprises: an inner cavity and internal baffling within the inner cavity; wherein the internal baffling comprises a first internal baffling material and a second internal baffling material;
    wherein the first internal baffling material comprises six cylinders connected at a central connecting point; wherein at least one cylinder comprises a cylindrical base and a cylindrical midsection;
    wherein at least four of the cylinders are aligned in a first plane to form a square planar structure; further wherein at least two cylinders are linearly aligned in a second plane and orthogonally aligned to the first plane to form an octahedral structure;

wherein the second internal baffling material comprises a plurality of dampening particles.

13. The apparatus of claim 12, wherein the internal baffling further comprises a third internal baffling material.

14. The apparatus of claim 13, wherein the third internal baffling material comprises a liquid.

15. The apparatus of claim 14, wherein the liquid comprises anti-freeze.

16. The apparatus of claim 15, wherein the third internal baffling material comprises a gel.

17. The apparatus of claim 12, wherein at least one cylinder comprises a fluted cylinder.

18. The apparatus of claim 12, wherein the internal baffling comprises three intersecting annuli; wherein the annuli comprise a first annulus, a second annulus and a third annulus.

19. An apparatus for damping vibration in at least one plane, the apparatus comprising:
   an enclosed housing; wherein the enclosed housing is comprised of a bottom wall and a side wall;
   a flooring surface, wherein the flooring surface is enclosed within the enclosed housing; wherein the flooring surface comprises a bowl-shaped surface; and
   a dampening weight, wherein the dampening weight is located within the enclosed housing; further wherein the dampening weight is comprised of a first mass which is configured to move on the flooring surface;
   wherein the dampening weight comprises: an inner cavity and internal baffling within the inner cavity; wherein the internal baffling comprises a first internal baffling material and a second internal baffling material;
   wherein the first internal baffling material comprises three intersecting annuli; wherein the annuli comprise a first annulus, a second annulus and a third annulus; wherein the second internal baffling material comprises a plurality of dampening particles.

20. The apparatus of claim 19, wherein the internal baffling further comprises a third internal baffling material; wherein the third internal baffling material comprises a liquid.

* * * * *